April 24, 1962 C. W. SOULÉ 3,031,055
DISPENSING AND VENDING MACHINE
Filed Sept. 18, 1958 7 Sheets-Sheet 1

Charles W. Soulé
INVENTOR.

BY *Clarence A. O'Brien*
*and Harvey B. Jacobson*
Attorneys

April 24, 1962

C. W. SOULÉ

3,031,055

DISPENSING AND VENDING MACHINE

Filed Sept. 18, 1958

Charles W. Soulé
INVENTOR.

BY Clarence A. O'Brien
and Harvey B. Jacobson
Attorneys

April 24, 1962

C. W. SOULÉ

3,031,055

DISPENSING AND VENDING MACHINE

Filed Sept. 18, 1958

Charles W. Soulé
INVENTOR.

BY *Clarence A. O'Brien*
and *Harvey B. Jacobson*
Attorneys

April 24, 1962 C. W. SOULÉ 3,031,055
DISPENSING AND VENDING MACHINE
Filed Sept. 18, 1958 7 Sheets-Sheet 4

Charles W. Soulé
INVENTOR.

BY *Clarence A. O'Brien*
*and Harvey B. Jacobson*
Attorneys

April 24, 1962 C. W. SOULÉ 3,031,055
DISPENSING AND VENDING MACHINE
Filed Sept. 18, 1958 7 Sheets-Sheet 6
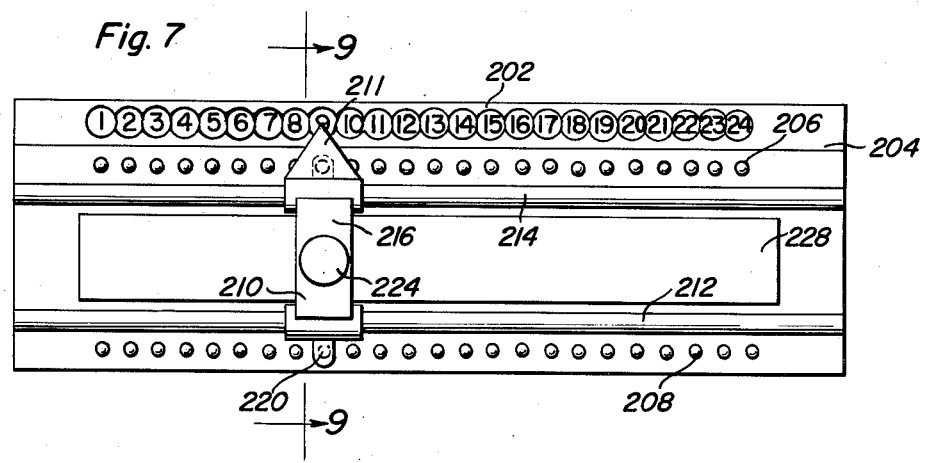
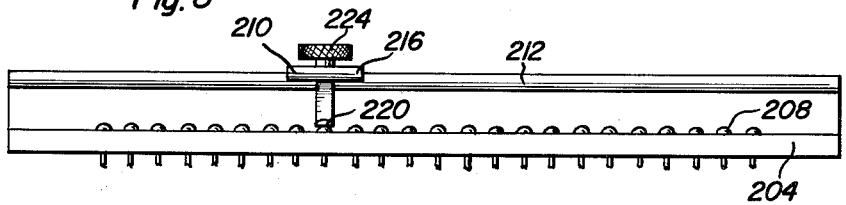
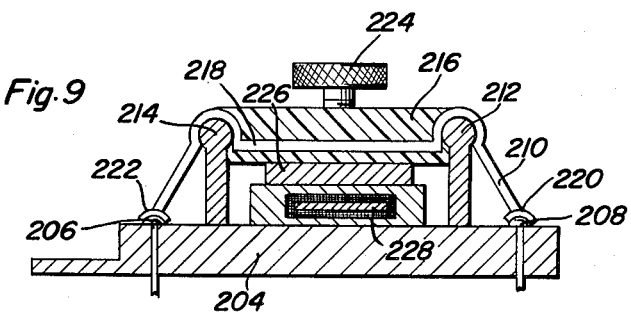
Charles W. Soulé
INVENTOR.

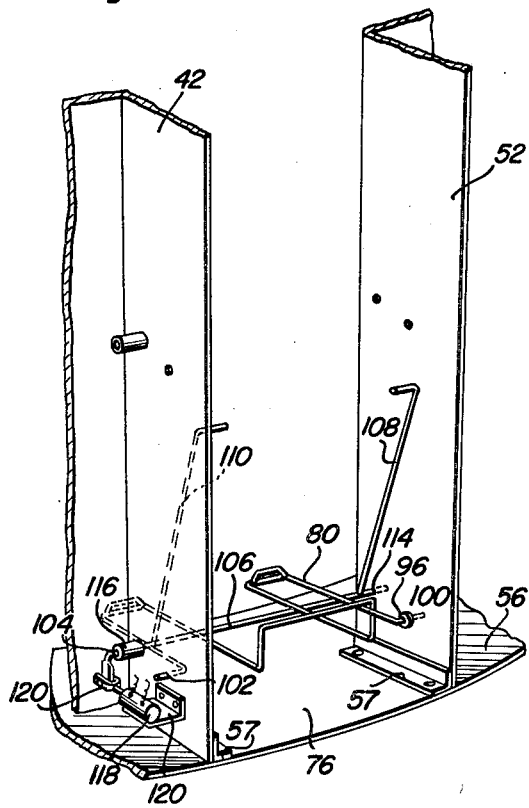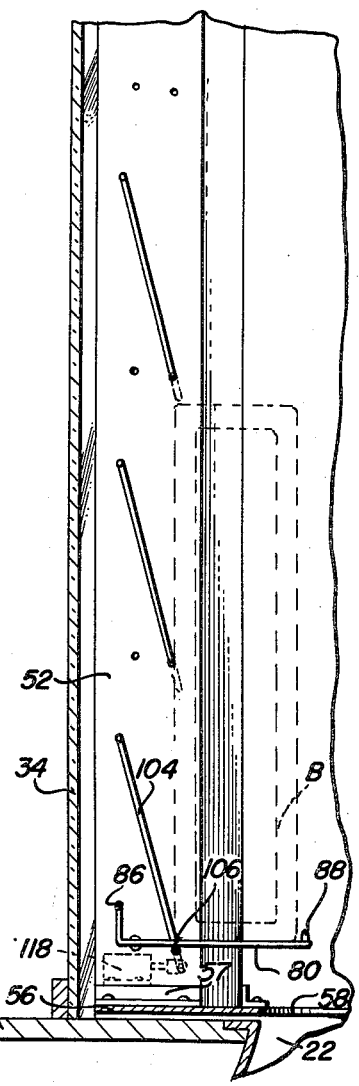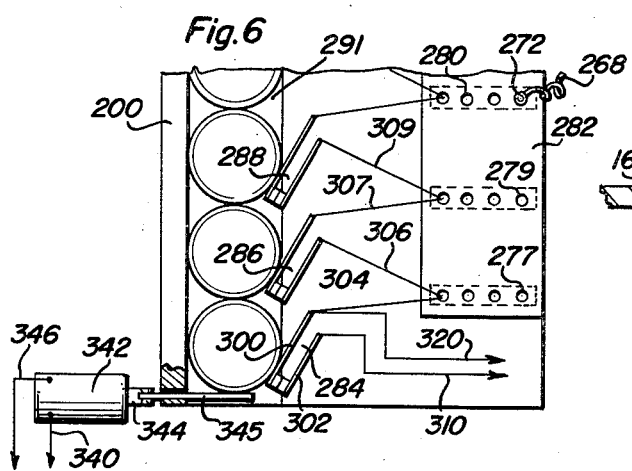

United States Patent Office 3,031,055
Patented Apr. 24, 1962

3,031,055
DISPENSING AND VENDING MACHINE
Charles W. Soulé, 1909 Francisco, Berkeley, Calif.
Filed Sept. 18, 1958, Ser. No. 761,733
11 Claims. (Cl. 194—10)

This is a continuation-in-part of my copending application, Serial No. 679,366, filed on August 21, 1957, now abandoned, and I claim the benefit of that filing date for all of the subject matter common to this application and the earlier filed application.

This invention relates to dispensing equipment and more particularly to a coin controlled vending machine.

There are numerous dispensing and/or vending machines that are especially designed for vending a large variety of uniform size articles. Although my machine is arranged to dispense florist's articles, the principles of the invention are applicable in connection with the vending of numerous other articles, especially those which are of different sizes and shapes and which are placed on sale at different prices.

Some difficulty has been encountered in machines for vending non-uniform size packages. Accordingly an object of this invention is to provide a vending machine which has a novel arrangement of article supports by which to accommodate comparatively bulky and different size packages such as those containing corsages, bouquets, single flowers and others.

In the vending of florist's products and this also applies to many other products, some articles are more expensive than others. Accordingly, a further object of the invention is to provide a unique electric circuit for programming a vending machine in such a way that certain compartments containing articles of a given price, have a customer selected article discharge when the proper money is deposited in a coin control device. Yet, when a more or less expensive article is desired, the chosen article will not be dispensed from the compartment containing it until the proper cost is met by depositing the correct sum of money in the coin control device.

The above referenced electric circuit has a plurality of electrically operated ejectors individually connected with a group of contacts of a customer operated selector switch which is identified by switch positions with articles in the compartments in the machine. There is another group of contacts in the selector switch, this group being separated into subgroups or sections each containing a plurality of contacts. The selector switch sections have electric conductors connected with them, and these conductors are adapted to be used as a part of a programming apparatus by which to set the costs of the various articles in the article containing compartments of the machine.

A further object of the invention is to provide a selector switch, programming apparatus and coin control device assembly for a vending machine in order to perform reasonably complicated functions with an exceedingly simple structural organization. In this regard the programming apparatus has a programming panel with a number of positions. The coin control device has a set of normally open, series connected switches with the terminal positions of the programming panel functioning as taps for the series connected switches. The switches are closed successively in response to the deposit of successive coins in the coin control device. Series connection between the set of switches is accomplished by the programming apparatus panel, there being furnished in the panel a number of additional terminal positions, for instance sockets, so that the conductors extending from the panel and to the selector switch, may be placed between any pair of the set of series connected switches. This has the result of requiring different numbers of coins, depending on where the connection is made between switches of the set, for energizing the contacts of a particular selector switch section and thereby setting the price at which the article ejectors in each of the compartments may be made to function.

An important feature of this invention is found in the mechanical simplicity of the circuitry in comparison to the versatility thereof. Further, the selector switch has an electrical interlock that holds the patron operated movable contactor in a fixed, selected position at the moment that the first coin is deposited in the coin control device. The contactor remains in this position until the purchased article is dispensed in response to which the coin chute is emptied enabling the first switch of the set of series connected switches to return to its normal, open position. This frees the switch contactor from the electrical interlock so that the contactor may be moved by the same or another patron to any other switch position for subsequent purchases.

Another feature of this invention is the mechanical arrangement for supporting articles in the various compartments. The compartments have side walls to which racks are separably attached, one above the other. Each rack is partially supported by the spindle of an oscillatory ejector. When the ejector is actuated, the package disposed on the rack is moved in a direction tending to slide the package off the rack. However the lower edge of the article strikes an abutment on the rack, toppling the package over and into a discharge opening in the machine. This assures that the package will be discharged from the rack and with a shorter stroke of the ejector.

Since the racks are separably attached to the walls of each compartment some of the racks may be removed, leaving the ejectors in place. For instance, in a given compartment a large packaged bouquet may be offered for sale by having it contained in one of the compartments. The compartment is prepared for the large package by removing one or more of the racks but leaving the ejectors for the removed rack or racks in place. Then the larger package is placed on the remaining rack or one of the remaining racks, taking up the space formerly occupied by the removed rack or racks. As a result one, two or more ejectors may be made to operate simultaneously to help move the large package off the rack on which it is supported.

Other objects and features will become evident in following the descripiton of the illustrated form of the invention.

FIGURE 6 is an enlarged diagrammatic view of a part of the coin control device and programming apparatus of the machine.

FIGURE 7 is an elevational view of a selector switch shown diagrammatically in FIGURE 5.

FIGURE 8 is a side view of the switch in FIGURE 7.

FIGURE 9 is an enlarged cross-sectional view of the selector switch and taken approximately on the line 9—9 of FIGURE 7.

FIGURE 10 is a fragmentary perspective view of one of the compartments in the rotor showing a single article support and ejector.

FIGURE 13 is an enlarged fragmentary sectional view showing one of the compartments of the machine adjusted to accommodate a package which occupies the space assigned to more than one rack in one compartment.

Figure 1:
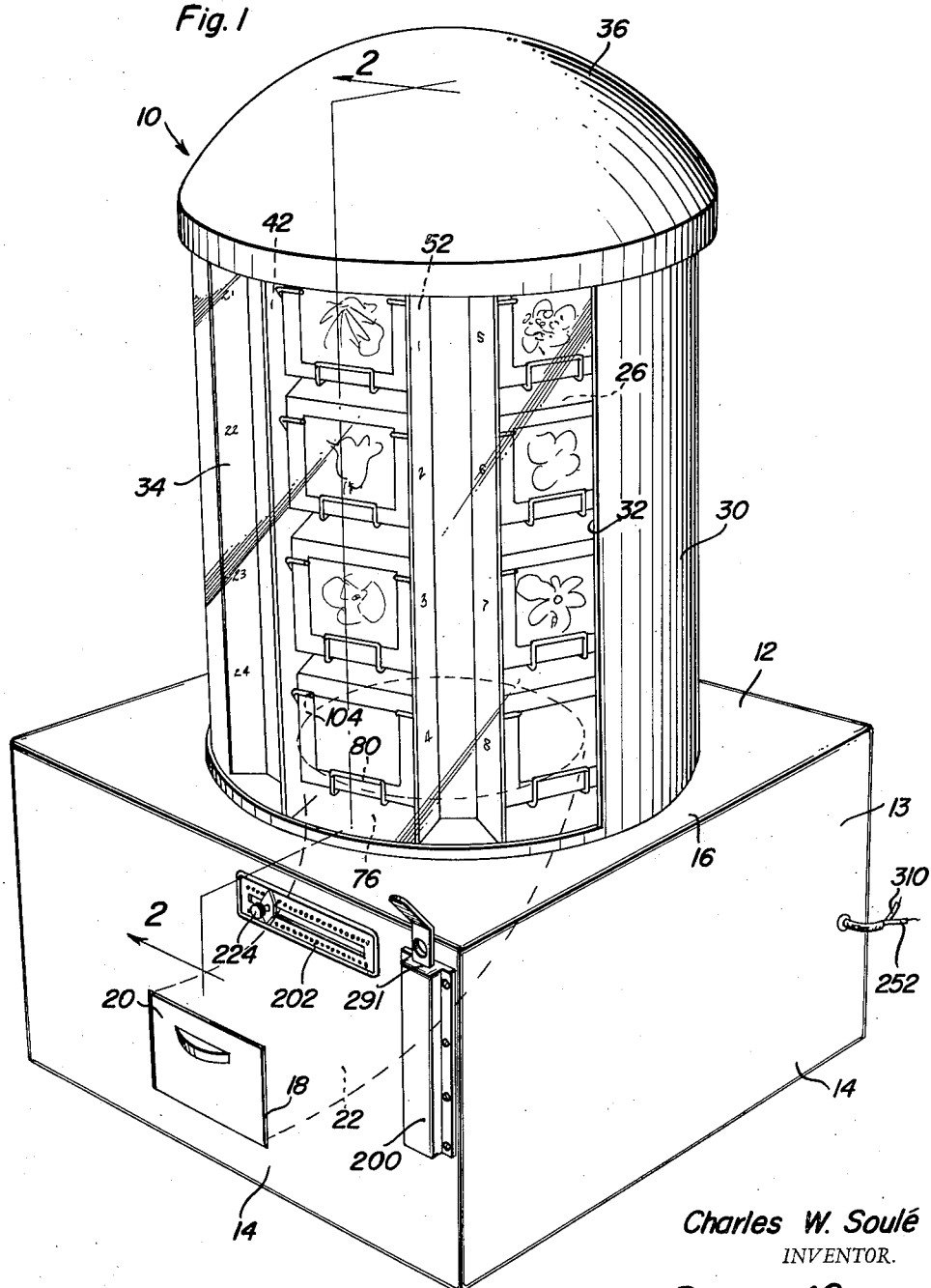
FIGURE 1 is a perspective view of a vending machine embodying the invention.

In the accompanying drawings there is a vending machine 10 constructed as an example of the invention. The machine has a housing 12 whose configuration may be varied considerably and still serve as a structural support for the operating mechanism of the machine. The housing has a base 13 made of a bottom, side walls 14 and an upper wall 16 connected with the side walls. One of the side walls has an opening 18 controlled by hinged door 20 and located in registry with one end of article discharge chute 22. The opposite end of the discharge chute is connected in registry with discharge opening 24 (FIG. 2) in wall 16 so that articles A discharged from the article storage rotor 26 may enter discharge opening 24, travel down chute 22 and be accessible at door 20 for the patron to accept.

Housing 12 has a rotor chamber 28 enclosed by cylindrical wall 30 secured to wall 16 of the housing base. Window opening 32 is in wall 30 and is covered by transparent panel 34 so that the contents of chamber 28 may be inspected by the prospective customer. Wall 30 may be attached to wall 16 in any way, for instance by being spot welded, riveted or bolted in place. Cover 36 has an inwardly extending flange 37 attached to the top part of wall 30, and cover 36 not only serves as a closure for the otherwise open upper end of the chamber 28, but also serves as a structural support for an electric motor 38. Hanger 40 is attached to cover 36 and to motor 38, holding it suspended at the top of chamber 28.

Rotor 26 is constructed of a plurality of parallel channels 42, 44, 46, 48, 50 and 52 respectively, each having angularly arranged sides. The channels are attached at their upper ends to a plate 54 of insulating material, the attachment being made by standard fasteners, e.g. mounting flanges 55 and rivets. The lower ends of the channels are similarly attached by rivets and mounting flanges 57 to a flat ring 56 provided with a central opening 58 that is in communication with chute 22 and constitutes a part of discharge opening 24. Anti-friction means support rotor 26 at its upper end in chamber 28. Typical anti-friction means are a group of balls 60 held captive in pockets in upper and lower races 62 and 64 respectively. The upper race has the peripheral portion of plate 54 seated on it, and the lower race is disposed on circular, inwardly directed flange 37 of cover 36.

Channels 42, 44, 46, 48, 50 and 52 are equally spaced from each other with the spaces between the channels and between plate 54 and ring 56 constituting compartments 66, 68, 70, 72, 74 and 76 respectively. There are four article supports in each compartment, and since there are six compartments in the illustrated form of the invention, the machine will accommodate twenty-four articles, although the capacity of the machine may be enlarged or reduced. Therefore numerical designations from one through twenty-four are applied at a convenient place on the rotor, for example on the channels whose sides constitute side walls of the compartments.

Figure 11:
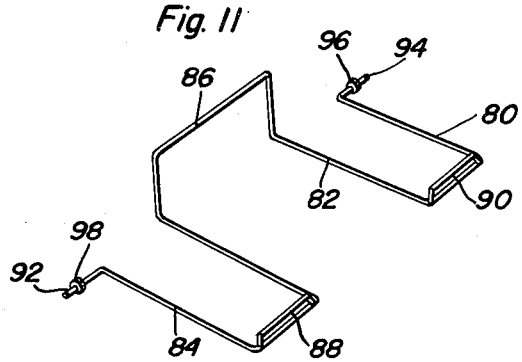
FIGURE 11 is a perspective view of one of the article supporting racks.

Each of the twenty-four article supports are made in the same way. A typical article support (FIGS. 10 and 11) is composed of a wire rack 80 having a pair of coplanar U-shaped sections 82 and 84 and a perpendicular, U-shaped connecting wire 86 attached to the inner, adjacent sides of U-shaped sections 82 and 84. Abutments 88 and 90 rise from the ends of sections 82 and 84 opposite to the ends having connector 86, and these constitute stops for the lower edge of article A or the article B (FIG. 13) or any other article as it is discharged from the rack. Trunnions 92 and 94 protrude laterally from the outer sides of sections 82 and 84, and these have stops 96 and 98 fixed to them and designed to contact the inner surfaces of the walls of one of the compartments, for example compartment 76. The trunnions 92 and 94 are projected through apertures 100 and 102 in the side walls of compartment 76, there being enough inherent springiness in the wire frame of rack 80 to snap the trunnions into the openings when engaging the rack with the side walls of the compartment, and to release rack 80 from the side walls of the compartment by squeezing inwardly on the sections 82 and 84.

Figure 12:
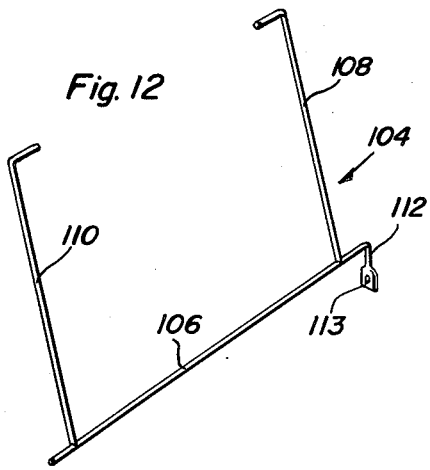
FIGURE 12 is a fragmentary perspective view of one of the electrically operated ejectors.
Figure 4:
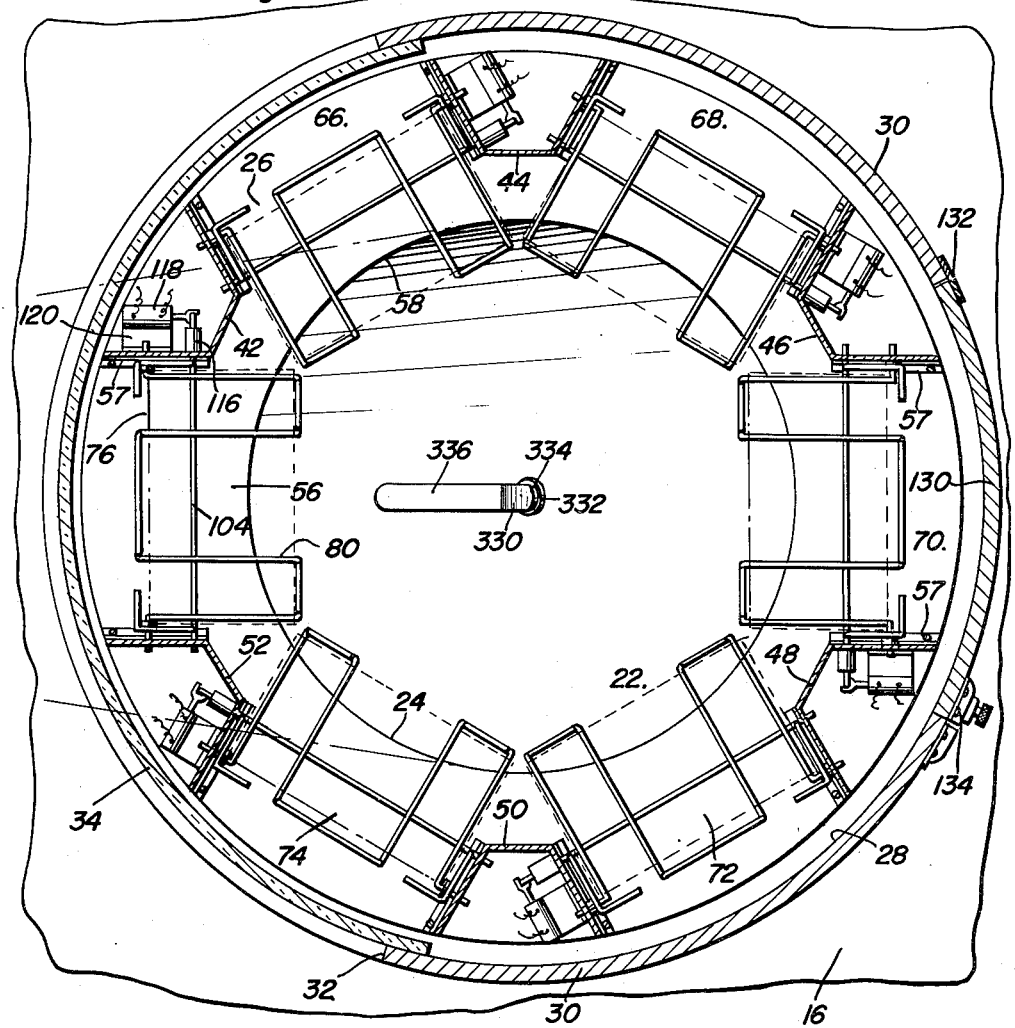
FIGURE 4 is a transverse sectional view taken on the line 4—4 of FIGURE 2.

There is an electrically operated ejector 104 for the rack 80 and a similar ejector for each rack in the rotor compartments. Typical ejector 104 (FIG. 12) has a spindle 106 and two substantially L-shaped, coplanar arms 108 and 110 fixed to the spindle. A right angular end on spindle 106 forms a crank 112. Ejectors 104 are not removable for ordinary operating adjustments of the machine, but racks 80 are separable from the compartments. Spindle 106 extends across compartment 76 and is located beneath sections 82 and 84 of typical rack 80. Since the spindle is mounted for rotation in an aperture 114 in side wall 52 and sleeve bearing 116 registered with an aperture in side wall 42 of compartment 76, the spindle 106 functions as a structural support for the otherwise pivotally mounted rack 80. Arms 108 and 110 are normally located behind an article A or B so that the article is pushed off rack 80 in response to oscillation of the ejector 104. Accordingly, the ejectors discharge the articles and secondarily support the racks 80.

Figure 5:
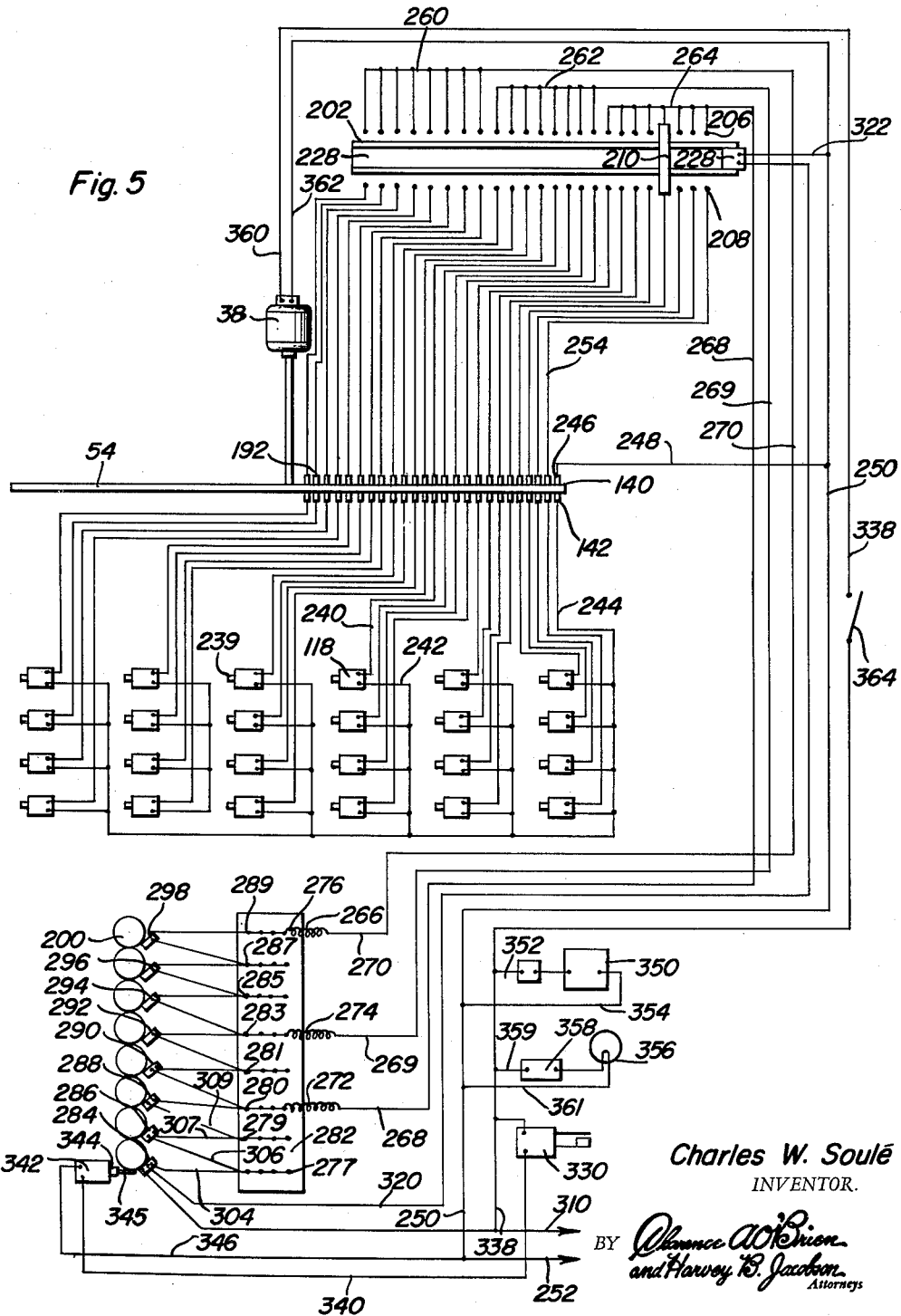
FIGURE 5 is a schematic wiring diagram illustrating the electric circuits of the machine.

The means for actuating the ejector 104 and all others like it are shown in FIGURE 5 as a group of solenoids. These will be discussed in detail subsequently, however, in FIGURE 10 there is a typical installation having solenoid 118 secured to mounting bracket 120 on channel 42 and located on the exterior of compartment 76. The solenoid has a fork 120 at the outer end of its armature and a pin passed through the alined openings in the fork and an aperture 113 in crank 112 that nests between the sides of the fork. When the solenoid 118 is energized its armature is retracted thereby oscillating the ejector 104 so that one or more arms attached to spindle 106 will push the article and slide it on rack 80 until the lower edge of the article strikes abutments 88 and 90. Then the article is slid no farther, but topples over the abutments and falls into chute 22 after passing through discharge opening 24. Thereafter the article may be recovered by opening the door 20 in the housing of the machine.

Rotor 26 is capable of being rotated by energizing motor 38. The motor has its shaft 126 bolted as at 128 or otherwise fastened to the top plate 54 of the rotor. There are two reasons for rotating the rotor. The first is for the patron to inspect the contents of the compartments in order to make his or her selection. The second is to load the compartments through the rear door 130 of the machine. The rear door is formed of a part of the side wall 30 of chamber 28 and is mounted on hinges 132. The door is made secure by a combination or key controlled lock-type latch 134.

The upper plate 54 of rotor 26 has a slip ring and brush assembly 140 operatively connected to it. With the upper plate made of electrically insulating material, the slip rings may be made of circular surface conductors adhered directly to or embedded in the plate. Further, the upper plate 54 may be made of a laminate with a stronger metal ply and an insulating ply containing the slip rings. For a machine having twenty-four racks there are twenty-five slip rings 142, 144, 146, 148, 150, 152, 154, 156, 158, 160, 162, 164, 166, 168, 170, 172, 174, 176, 178, 180, 182, 184, 186, 188, 190, respectively, concentrically arranged with respect to motor shaft 126. Brush holder 192 contains twenty-five discrete brushes in contact with the twenty-five slip rings and is structurally supported above the slip rings within the cover 36 of the machine housing.

Reference is now made principally to the electrical circuitry (FIGS. 5 and 6), the coin control device 200 (FIGS. 1 and 5), and the selector switch 202 (FIGS. 1, 7, 8 and 9). Switch 202 is a special switch having a base 204 attached to the side 14 of the housing base 13. Base 204 has a first group 206 of contacts secured to it and a second group 208 of contacts spaced from the first group. Movable contactor or slide 210 has a pointer 211 and is engaged with a pair of rails 212 and 214 parallel to the groups 206 and 208 of contacts. The slide or movable contactor 210 is composed essentially of an insulating block 216 with a conductive strip 218 embedded in it and having contact pads 220 and 222 at its ends and adapted to bridge pairs of contacts, each pair consisting of one contact in each group 206 and 208. For the convenience of the patron a knob 224, handle or the like is attached to block 216 and is exposed at the front of the machine. The contacts in each group are numerically designated to identify the articles in the compartments 66, 68, 70, 72, 74 and 76.

Magnetizable strip 226 is secured to block 216 and is movable over an insulated electromagnetic coil 228 which is secured to base 204. The electromagnetic coil 228 is a holding coil, attracting magnetizable strip 226 and holding contactor 210 in a fixed position when the coil 228 is energized. When coil 228 is deenergized, slide 210 is free to move to any of the twenty-four positions thereof.

Attention is now invited to FIGS. 5 and 6. The group 239 containing twenty-four solenoids for actuating the twenty-four ejectors are shown diagrammatically. The typical solenoid 118 shows how each of the solenoids are operatively connected with the slip ring and brush assembly. An electrical conductor 240 is connected to the coil of solenoid 118 and to its slip ring 166 in the slip ring and brush assembly 140. Electrical conductor 242 is connected to opposite end of the coil of solenoid 118 and to a wire 244 which similarly attaches to each of the remaining solenoids in the group 239. The wire 244 is connected to slip ring 142 which has brush 246 in contact with it. Wire 248 is attached to brush 246 and to a conductor 250, the latter attaching by way of lead 252 to one side of a source of electrical potential.

There are conductive means 254 operatively connected with the brushes in brush holder 192. The conductive means 254 consist of the illustrated twenty-four wires (unnumbered) with one wire connected at one end to each brush, except brush 246 which has wire 248 secured to it. The opposite ends of these wires are connected to the twenty-four contacts of the second group 208 of contacts in selector switch 202. The first group 206 of contacts in the selector switch are arranged in three sections 260, 262 and 264 with a group of eight contacts in each section.

Programming apparatus 266 adjusts the selling price at which articles A are vended. This apparatus consists of three electrical conductors, there being a first conductor 268, a second conductor 269 and a third conductor 270. The first conductor 268 is connected at one end with each of the contacts in section 264 of the selector switch 204. The second conductor 269 is connected at one end with each of the contacts in the second section 262 of switch 202, and the third conductor 270 has one end connected with each of the contacts of the third section 260 of switch 202. Plugs 272, 274 and 276 are at the opposite ends of conductors 268, 269 and 270 and are removably fitted into selected sockets in the programming panel 282. The sockets are in groups of four with each of the four sockets connected for electrical continuity, for instance by a buss bar. There are eight groups 277, 279, 280, 281, 283, 285, 287 and 289 of sockets in panel 282. Even though plugs 272, 274 and 276 and the sockets for the plugs are a satisfactory way of separably connecting the conductors 268, 269 and 270 in the programming apparatus, this may be varied. For instance binding posts and eyelets could well be used and at a reduced cost. In each case, though, the plugs, sockets or the equivalent constitute tap stations between the subsequently described set of series connected switches.

The coin accepting or control device 200 is made of a coin chute 291 which accepts coins of one denomination, for instance fifty cent pieces. There are eight normally open control switches 284, 286, 288, 290, 292, 294, 296 and 298 respectively alongside of coin chute 291. Each switch, for instance switch 284 of the set of switches, is composed of a pair of contact supporting switch arms 300 and 302 maintained in a normally open position and closed by the deposit of a coin in the coin shute 291. Further, each switch of the set of switches has one group of four sockets connected with it, and the socket groups are located between switches of the set. The set of switches 284, 286, 288, 290, 292, 294, 296 and 298 are series connected by electric conductors. The network of conductors is typified by conductor 304 extending from switch 284 and connected with the first group 277 of sockets. Conductor 306 extends from the same group 277 of sockets and is operatively attached to switch 286. Conductor 307 is connected to switch 286 and to group 279 of sockets. The next connection is between group 279 of sockets and switch 288 via wire 309. The electrical wiring is continued in this way thereby connecting each switch of the set of switches in series. As shown in FIGS. 5 and 6, the deposit of the first coin in coin control device 200 will close the normally open switch 284. The deposited second coin will close the second switch 286 in the set, and the third coin will close the third switch 288 in the same set of switches. Since the set of switches is operatively connected with the coin control device 200, and it will accept eight fifty cent pieces, the capacity of the coin control device and programming apparatus in the illustrated machine, is four dollars.

The set of switches is connected by lead 310 with one side of a source of electric potential, arbitrarily considered as the starting side for current flow. The lead is connected with the first switch 284 in the set, and current for actuating a selected ejector solenoid passes through some of the series connected switches, or all of them depending on the selection made by the patron, current conduction being through one or more of the conductors 268, 269 and 270, the selector switch 202, the conductive means 254, and the slip ring and brush assembly 140. Tracing the current through the machine with the programming apparatus adjusted as shown in FIG. 5, assume first that the contactor 210 of the selector switch is in the position shown. Now assume that the patron deposits one coin in the coin control apparatus 200. This coin closes switch 284 and current may flow only as far as the second switch 286, because it is in its normally open position. No conductors are in the group 277 of sockets for switch 284 and therefore the programming apparatus will permit none of the ejectors to operate.

However, wire 320 is connected to the switch controlled side of switch 284 and to the electromagnetic coil 228 of selector switch 202. Current flows through the coil and returns by wires 322 and 250, and 252 to the side of the source of electrical potential opposite from the starting side through wire 310. Accordingly, when the first coin is deposited in the coin control apparatus 200, switch 284 becomes closed thereby energizing the electromagnetic coil 228, and this prevents the patron from moving the contactor 210 since it becomes electromagnetically locked. The deposit of the second coin in coin control device 200 merely closes switch 286 making no changes in this part of the circuitry. The deposit of the third coin, making a total deposit of one dollar and fifty cents, closes switch 288 and enables current to flow through the first three series connected switches 284, 286, and 288 and the first conductor 268 which is plugged into one of the sockets in the group 280 connected between switches 288 and 290 of the set of switches. Conductor 268 is connected with all of the contacts of the first switch section 264 so that each of them is conductive. The patron having made the selection of the fourth pair of contacts from the right (FIG. 7) has selected article located in space numbered twenty-one of compartment 76 at a selling price of one dollar and fifty cents. One wire of conductive means 254 conducts current from the contactor 210 on contacts in section 264 and group 208 through the slip ring and brush that is connected with the bridge contacts, the correct ejector solenoid and then through the common wire 244, slip ring 142, brush 246, wire 248, wire 250 and finally to the lead 252 opposite to that from which current was assumed to have commenced flowing.

If the patron had contactor 220 bridging the contacts in the second or third sections of the selector switch no current would flow to the second and third sections of selector switch 202 and no article would be ejected and dispensed, since the second conductor 269 is attached higher on programming panel 282. However, had the patron deposited two additional coins, making a total of two dollars and fifty cents, the series connected switches 290 and 292 would be closed and therefore, conductor 269 would be conductive for the second section 262 of selector switch 202. The same applies for the final section 260 of switch 202. In the condition of the machine shown in FIG. 5, it would require four dollars, that is eight fifty cent coins; to close all of the switches of the set in order that conductor 270 may become conductive. By placing the conductors 270 anywhere in the sockets in the programming apparatus panel 282, a different number of coins will be required for the completion of a sale of the article chosen by the patron.

Even though programming apparatus 266 enables the articles in the several compartments of the machine to be vended at different selling prices, there is a wide latitude in the selection of arrangements of selling prices for the articles in the machine. For instance, all articles can be made to be sold for any price within the upper and lower limits of four dollars and fifty cents respectively. These limits could very easily be enlarged or made smaller by the addition of more switches in the set of series connected switches, a larger panel with more sockets or by a corresponding reduction in both. If the three conductors 268, 269 and 270 had their plugs 272, 274 and 276 in three of the sockets in the group 277 between switches 284 and 286, all of the articles in the machine would be on sale for fifty cents each. This is so because the first deposit of a fifty cent coin would close the only switch 284 in the set of switches necessary to energize all the contacts of the first group 296 in selector switch 204. The same applies for the maximum price, that is eight coins, by placing the three plugs 272, 274 and 276 in the sockets of group 289 which are operatively connected with the switch 298. Various permutations between these two extremes are obtainable by placing the plugs in the different sockets of programming panel 282.

Figure 2:
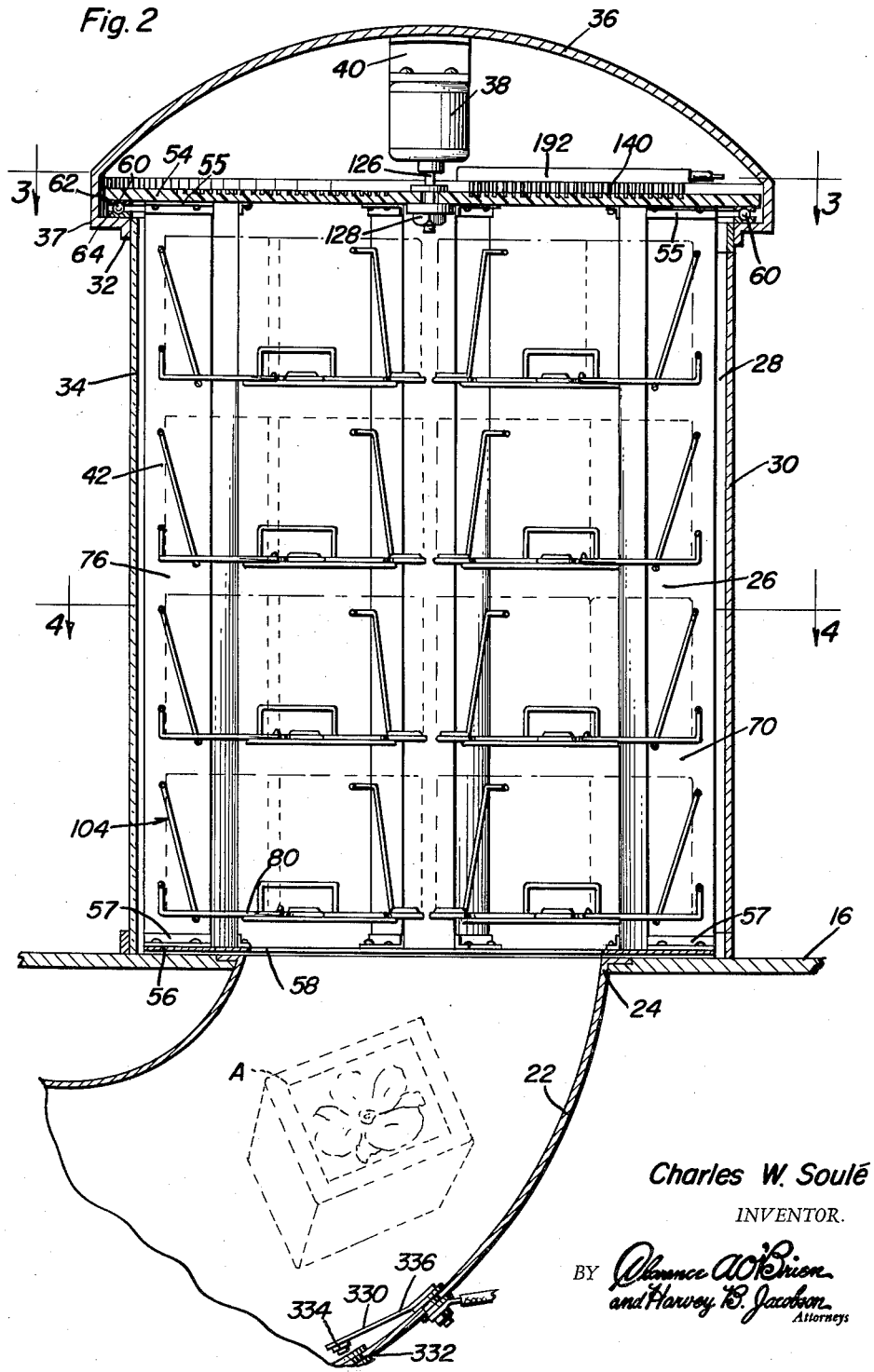
FIGURE 2 is a sectional view taken on the line 2—2 of FIGURE 1 and showing in dotted lines, a typical article in the process of being dispensed.
Figure 3:
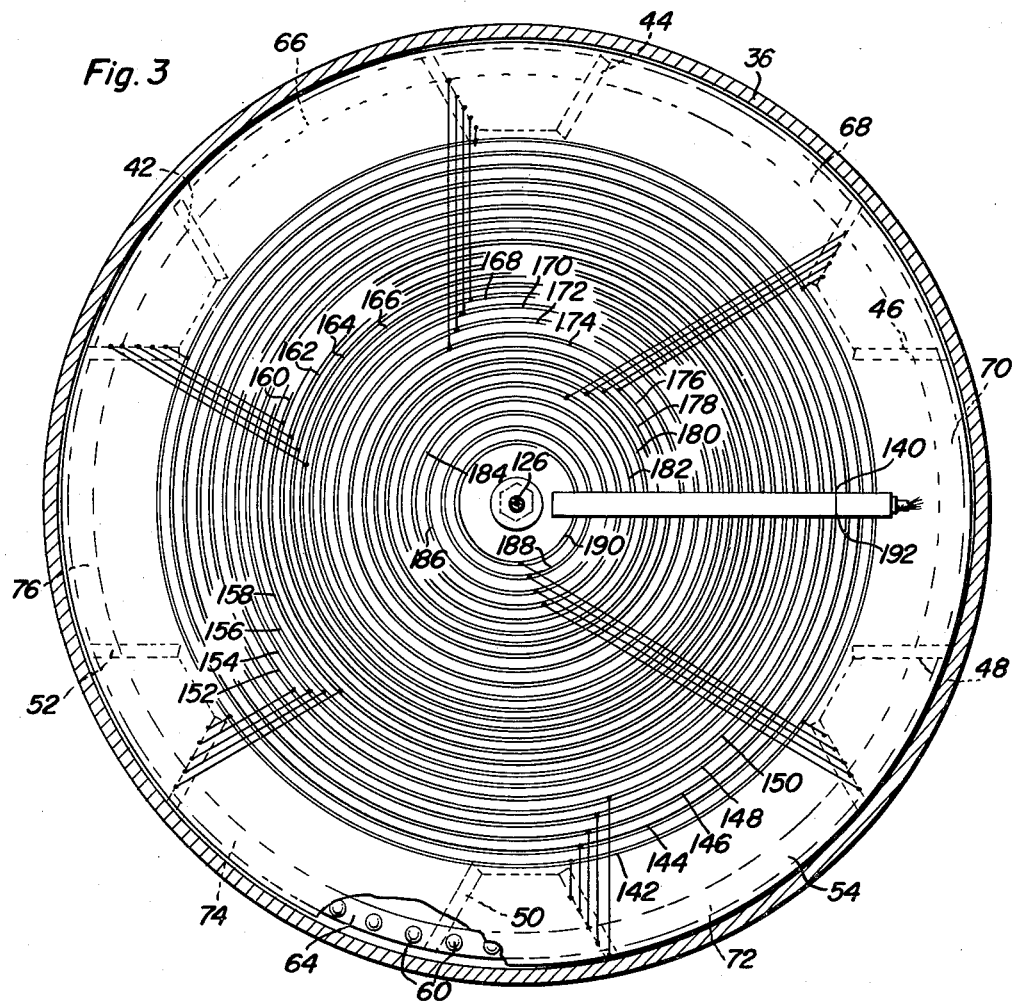
FIGURE 3 is a sectional view taken approximately on the line 3—3 of FIGURE 2 and showing partially diagrammatically a slip ring-brush assembly and wiring connections between the slip rings and compartments of the machine rotor.

When the purchased article drops into chute 22, it strikes the normally open switch 330 located in the chute 22 and in the path of travel of all articles discharged from rotor 26. Therefore the switch 330 is in vertical alinement with the longitudinal central axis of rotor 26 and discharge opening 24. The switch 330 may be a microswitch or simply a fixed contact 332 and a movable contact 334 on the end of a spring arm 336 (FIG. 2). Wire 338 is connected to lead 310 and to one side of switch 330. The other side of switch 330 has a conductor 340 attached to it and connected to solenoid 342. This solenoid has an armature 344 which is attached to and actuates a slide 345 in coin control device 200. Slide 345 forms the bottom of the coin chute 291. Slide 345 is so spaced from the arms 300 and 302 of switch 284 that coins smaller in diameter than a fifty cent piece (when the machine is to be operated on fifty cent coins) will drop therebetween. However, fifty cent coins will seat upon slide 345 and close the lowermost switch 284 of the set of series connected switches. Conductor 346 is connected to the coil of solenoid 342 and to lead 252 which goes to the opposite side of the source of electrical potential from that connected with the series connected switch 330 and solenoid 342. The result is that the coin chute is emptied when the purchased article drops into the discharge chute 22 and momentarily closes switch 330.

The remaining parts of the circuitry in FIG. 5 are wholly schematic. The refrigeration equipment 350 is shown with electric conductors 352 and 354 connected across wires 250 and 338, these being attached to leads 310 and 252 of the electric source. The refrigeration equipment is not structurally illustrated in the machine, although for the vending of flowers and many other items, refrigeration is necessary. Further, it is within the purview of the invention to have heating equipment instead of refrigeration equipment, when the vending machine is used for dispensing products which should be maintained at an elevated temperature level. The lighting 356 has a control switch 358 connected in series with it and connected across leads 310 and 252 by wires 359 and 361. Motor 38 for the rotor 26 has a pair of conductors 360 and 362 connected to the two leads 252 and 310 by way of wires 250 and 338. Switch 364 to control the operation of motor 38, is in conductor 338 at a place where it will not interfere with the operation of the refrigeration equipment, lighting and solenoid control switch 330.

The detailed operation of the structural and electrical phases of the machine have been described. For vending, a patron who approaches the machine may close switch 364 after inspecting those packages displayed through window opening 32. This will cause additional compartments to move directly behind the window opening so that the patron may inspect all of the articles in the machine. After seeing the packaged flowers that constitute the articles dispensed by the vending machine in the described embodiment of my invention, the patron opens switch 364 to stop the rotor and make a selection by operating selector switch 202. It is unnecessary to have the switch 364 under the control of the patron. The speed of the rotor 26 may be slow and the rotor continues to rotate at all times since dispensing may take place while the rotor is in motion.

The patron makes his selection by moving the switch contactor until it is in a position at which the pointer on the contactor is opposite to the numeral on switch 202 which corresponds to the numerical designation of the space in the rotor containing the article that he wishes to purchase. Then the proper number of coins is deposited in the coin control device 200 thereby causing the correct ejector to operate automatically, and move the article being purchased from its rack and into the chute. The article then is received through the door opening 18. The machine is then ready for another similar cycle of operation and article sale.

Although only one embodiment of the invention is illustrated and only a few variations thereof mentioned in the preceding description, it is understood that these are for illustrative purposes only and that all variations, modifications, changes or any alteration whatsoever falling within the scope of the following claims may be resorted to.

What is claimed as new is as follows:

1. In a vending machine having a rotor provided with a plurality of compartments in which to retain various articles, electrically operated ejectors for each compartment, a selector switch having first and second groups of contacts and a contactor to bridge a selected pair of contacts in said first and second groups, conductive means connecting said ejectors with said second group of contacts of said selector switch, a first conductor connected with the contacts of a portion of said first group of contacts, a second conductor connected with the contacts of another portion of said first group of contacts, means connected with said first and second conductors and adapted to connect with a source of electric potential for energizing a selected portion of the first group of contacts, said selected contact group portion energizing means including a set of coin operated series connected switches, means for connecting said first and said second conductors between selected switches of said set and thereby operatively connecting selected switches of said set with said contact portions of said first group of contacts, means for connecting said set of series connected switches to one side of an electric potential source, means for connecting said ejectors to the other side of said potential source, a coin accepting device with which said set of switches is operatively connected and by which one switch of said set is closed in response to the acceptance of each coin, a first switch of said set closed in response to the acceptance of the first coin, and means connected with said first switch and said selector switch for holding said contactor in the selected position when said first switch of said set is closed.

2. The vending machine of claim 1, wherein said contactor holding means includes an electromagnetic coil associated with said contactor and connected in series with said first switch and said source of electric potential.

3. In a vending machine for articles of different selling prices and which has means to support the articles, a set of coin actuated switches, means including programming apparatus connecting said set of switches in series, means to connect one end switch with an electric source, said apparatus including a conductor connected between selected switches to thereby constitute a tap in said set of series connected switches, a plurality of electrically operated article ejectors, a selector switch connected with said conductor, said selector switch having a first group of fixed contacts with which said conductor is connected, a mating group of fixed contacts connected with said ejectors, a bridging contactor adapted to bridge pairs of fixed contacts to select a particular ejector for energization, and means operatively connected with said bridging contactor for holding said contactor fixed in response to the closing of the first coin actuated switch of said set of series connected switches.

4. In a dispensing machine which has a number of compartments in which to retain articles, electrically actuated means for discharging an article from a selected compartment, a selector switch by which to choose the desired article and including a plurality of sections, conductive means operatively connected to said selector switch and said discharging means, a set of control switches adapted to be connected with an electric source and to be successively actuated, programming apparatus for selected groups of article releasing means in said compartments and including a plurality of conductors connected between selected control switches of said set and to said switch sections, said selector switch sections each having a group of contacts, and a movable contactor bridging a selected contact and said conductive means, and means connected to one of said control switches and said selector switch for holding said movable contactor until an article is dispensed from one of said compartments.

5. A vending machine comprising a rotor having a plurality of article accommodating compartments, means for supporting the articles in said compartments, electrically operative article ejectors carried by said rotor, a manual selector switch for choosing an article in said compartments and including a plurality of switch sections, each section having a group of first contacts and a plurality of second contacts, a movable contactor for bridging a selected pair of first and second contacts to thereby select the desired article, conductive means connecting said second contacts to said electrically operative article ejectors, a device having a set of control switches adapted to be connected with an electric source, programming apparatus to energize the contacts of said selector switch sections and including conductors connected between selected control switches of said set and to said selector switch sections, a housing in which said rotor is disposed, means mounting said rotor for rotation, said conductive means including a slip ring and brush assembly connected to said rotor and housing, said ejectors including arms movably connected to said rotor, solenoids connected to said arms, and conductors connected to said slip ring and brush assembly and to said solenoids.

6. A vending machine comprising the combination of a rotor having a plurality of article accommodating compartments, means for supporting the articles in said compartments, electrically operative article ejectors carried by said rotor, a manual selector switch for choosing an article in said compartments and including a plurality of switch sections, each section having a group of first contacts and a plurality of second contacts, a movable contactor for bridging a selected pair of first and second contacts to thereby select the desired article, conductive means connecting said second contacts to said electrically operative article ejectors, a control device having a set of control switches adapted to be connected with an electric source, programming apparatus to energize the contacts of said selector switch sections and including conductors connected between selected control switches of said set and to said selector switch sections, a housing in which said rotor is mounted for rotation, said rotor having spaced walls that constitute side walls of said compartments, said article supporting means comprising racks separably attached to said walls, said ejectors having spindles mounted in said walls and partially supporting said racks, and at least one arm fixed to each spindle and adapted to push an article from one rack.

7. A vending machine comprising the combination of a rotor having a plurality of article accommodating compartments, means for supporting the articles in said compartments, electrically operative article ejectors carried by said rotor, a manual selector switch for choosing an article in said compartments and including a plurality of switch sections, each section having a group of first contacts and a plurality of second contacts, a movable contactor for bridging a selected pair of first and second contacts to thereby select the desired article, conductive means connecting said second contacts to said electrically operative article ejectors, a control device having a set of control switches adapted to be connected with an electric source, programming apparatus to energize the contacts of said selector switch sections and including conductors connected between selected control switches of said set and to said selector switch sections, a housing in which said rotor is mounted for rotation, said rotor having spaced walls that constitute side walls of said compartments, said article supporting means comprising racks separably attached to said walls, so that at least one of said racks may be removed from a compartment to accommodate a larger article, and abutments on said racks against which the lower part of the articles strike when moved by said ejectors so that the articles are toppled off said racks.

8. In a vending machine, a housing, a rotor in said housing and having an upper support plate, a plurality of walls depending from said support plate, said walls being spaced to provide individual article containing compartments, said rotor having a bottom discharge opening for the articles, a plurality of article support racks between said walls, ejectors movable above said racks to push articles from said racks and into said discharge opening, electrical means connected to said ejectors for actuating said ejectors, a control device carried by said housing, a selector switch having a first and a second group of contacts, said second group of contacts connected for electrical conduction with said electrical means, and programming apparatus operatively connected to said control device and said first group of contacts of said selector switch to energize an ejector chosen by the position of said selector switch.

9. In a vending machine having a plurality of article compartments and electrically actuated ejectors to discharge articles from said compartments, the improvement comprising an adjustable selector switch having a first and a second group of contacts, conductive means connecting said contacts of said second group with said electrically actuated ejectors, a coin control device, adjustable programming apparatus operatively connected to said coin control device and said selector switch sections for energizing a selected ejector in accordance with the position of said selector switch and adjustment of said apparatus and in response to a selected number of coins deposited in said coin control, and means responsive to the acceptance of the first coin in said coin control device for holding said selector switch in a fixed position of adjustment until said coin is released.

10. A vending machine comprising the combination of a rotor provided with a plurality of compartments, a plurality of racks in each compartment and adapted to support articles to be dispensed, electrical ejectors carried by said rotor to move the articles from said racks, electrically operated means for actuating said ejectors, a coin control device adapted to accept coins, a set of series connected switches, each switch of said set adapted to be operated by a single coin deposited in said coin control device, a selector switch having a contactor movable to positions responding to rack positions in said compartments, means connected with said selector switch for holding said contactor in a fixed position in response to the actuation of one of said series connected switches, conductive means operatively connected with said selector switch and said ejector actuating means, and programming apparatus operatively connected to said selector switch and between selected switches of said set of switches to establish the number of coins required to energize said ejector actuating means through said selector switch.

11. A vending machine comprising frame means rotatably journalling a continuously rotating rotor means, a plurality of circumferentially disposed article carrying compartments mounted on said rotor means, article delivery means including delivery passage means axially disposed within said rotor means and in communication with said compartments and a stationary discharge chute in alignment therewith, a plurality of ejector means operatively mounted in each compartment and movable therewith, a plurality of ejector control means mounted on said rotor means and operatively connected to said ejector means for selective operation thereof, selector means mounted on said frame means, rotary transfer means mounted on said rotor means operative to interconnect said selector means and said ejector control means to eject articles from selected compartments.

References Cited in the file of this patent

UNITED STATES PATENTS

| | | |
|---|---|---|
| 441,861 | Van Sant | Dec. 2, 1890 |
| 445,263 | Kinney | Jan. 27, 1891 |
| 1,498,548 | Hughes | June 24, 1924 |
| 1,686,091 | Manning | Oct. 2, 1928 |
| 1,867,496 | Cable | July 12, 1932 |
| 2,167,459 | Long | July 25, 1939 |
| 2,354,896 | Weiler | Aug. 1, 1944 |
| 2,356,687 | O'Reilly | Aug. 22, 1944 |
| 2,376,403 | Thompson | May 22, 1945 |
| 2,500,437 | Tandler | Mar. 14, 1950 |
| 2,570,821 | Kornberg | Oct. 9, 1951 |
| 2,606,639 | Dolman | Aug. 12, 1952 |
| 2,679,308 | Moore | May 25, 1954 |
| 2,894,612 | Care | July 14, 1959 |

FOREIGN PATENTS

| | | |
|---|---|---|
| 550,228 | Great Britain | Dec. 30, 1942 |
| 597,377 | Great Britain | Jan. 23, 1948 |